United States Patent [19]

Yanaga et al.

[11] Patent Number: 4,952,319
[45] Date of Patent: Aug. 28, 1990

[54] PROCESS FOR SEPARATING LIQUID MIXTURE

[75] Inventors: Yukio Yanaga, Tsukui; Asazi Hayashi, Jouetsu; Shizue Kamata, Yokohama; Toru Imanara, Atsugi, all of Japan

[73] Assignee: Mitsubishi Kasei Corporation, Tokyo, Japan

[21] Appl. No.: 245,397
[22] PCT Filed: Dec. 11, 1987
[86] PCT No.: PCT/JP87/00965
§ 371 Date: Sep. 19, 1988
§ 102(e) Date: Sep. 19, 1988
[87] PCT Pub. No.: WO88/04569
PCT Pub. Date: Jun. 30, 1988

[30] Foreign Application Priority Data
Dec. 15, 1986 [JP] Japan .................. 61-298424

[51] Int. Cl.$^5$ .............................................. B01D 61/36
[52] U.S. Cl. ..................................... 210/640; 210/654
[58] Field of Search ...................... 210/500.37, 500.38, 210/500.39, 634, 640, 644, 649–654

[56] References Cited

U.S. PATENT DOCUMENTS 3,789,079  1/1974  Perry et al. .
4,307,135  12/1981  Fox .
4,532,041  7/1985  Shuey .
4,755,299  7/1988  Bruschke .

FOREIGN PATENT DOCUMENTS 54-33279   3/1979  Japan .
58-21629   2/1983  Japan .
58-38301   2/1983  Japan .
58-95523   6/1983  Japan .
59-109204  6/1984  Japan .
59-230604  12/1984  Japan .
60-22902   2/1985  Japan .
62-42722   2/1987  Japan .
62-74410   4/1987  Japan .
62-74411   4/1987  Japan .
62-114611  5/1987  Japan .
62-114628  5/1987  Japan .
62-163712  7/1987  Japan .
62-201605  9/1987  Japan .
62-231017  10/1987  Japan .
63-90533   4/1988  Japan .
63-91122   4/1988  Japan .

OTHER PUBLICATIONS

Chem. Abstracts 107:63 No. 155658X (Nov. 1987).
Chemabs (ESA) No. 107(18)155658.

Primary Examiner—Frank Sever
Attorney, Agent, or Firm—David G. Conlin; Gregory D. Williams

[57] ABSTRACT

A separation method for a liquid mixture, which comprises removing water from said liquid mixture by pervaporation using a membrane, the main constituent material therefor being a copolyimide having the structure represented by the constitutional repeating unit of the following general formula (I):

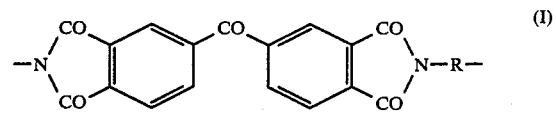

wherein R represents

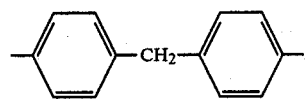

for from 10 to 30 mol % of said repeating unit, while R also represents

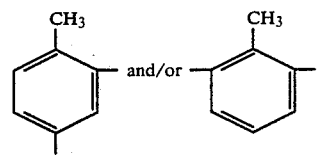

for from 90 to 70 mol % of said repeating unit, or a copolyamide-imide comprising from 90 to 10 mol % of the constitutional repeating unit having the structure represented by the formula (II):

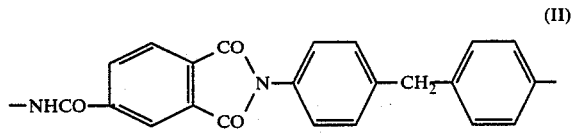

and from 10 to 90 mol % of the constitutional repeating unit having the structure represented by the formula (III):

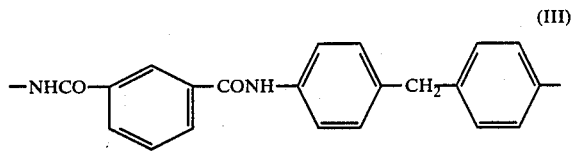

8 Claims, No Drawings

PROCESS FOR SEPARATING LIQUID MIXTURE

DESCRIPTION

1. Technical Field

The present invention relates to a separation process of removing the water from a liquid mixture by pervaporation using highly hydrophilic polymeric material.

2. Background Art

Removal of the water from water-soluble liquid is often necessary in the industrial field and separation methods such as vaporization, freezing, extraction, dialysis and reverse osmosis have been employed selectively depending on the conditions upon use.

As the water soluble liquid, there can be mentioned oxygen-containing organic compounds such as alcohols, phenols, esters, ketones, ethers, aldehydes and organic acids, nitrogen-containing organic compounds such as nitriles, inorganic compounds such as inorganic acids, as well as mixtures thereof.

Although the methods as described above can be mentioned for the removal of the water from the liquid mixture, it can not always be said that they are suitable to the separation of those forming azeotropic mixtures or the separation of materials having similar boiling points from each other, and research and development for the separation by pervaporation have become vigorous in recent years by the demand also in view of the energy. Further, since heat resistance, chemical resistance and mechanical strength are also important as well as the separating performance upon actual use, it has been demanded for the development of such material as having high separation performance while taking consideration with the properties.

For the above purpose, there are remarkable problems how to provide a membrane with the characteristic affinity with a compound to be separated, how to form an extremely thin membrane efficiently, often with no pinholes, for obtaining a practical separation performance and, further, how to keep the endurance against the compounds in a liquid mixture intended to carry out the separation.

The present inventors, taking notice of the foregoings, have made development and study on polymeric material excellent in the heat resistance, chemical resistance and mechanical strength and having high separating performance and, as a result, have attained the present invention on the finding that an aromatic copolyimide or copolyamide-imide of a specific structure is excellent in view of the membrane-formation, durability and also in view of the separating performance.

DISCLOSURE OF THE INVENTION

The feature of the present invention lies in a separation process for a liquid mixture of removing the water from a liquid mixture by a pervaporation method in which the main constituent material for a membrane is a copoly-imide comprising the constitutional repeating unit represented by the following general formula (I):

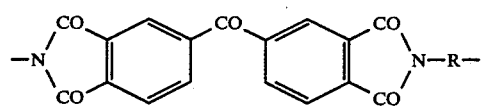

wherein R represents

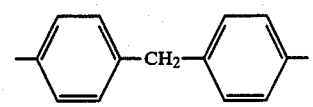

in 10 to 30 mol % of said constitutional repeating units, while R represents

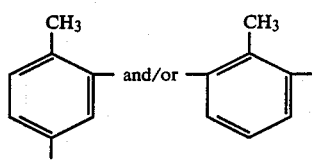

in 90 to 70 mol % of said constitutional repeating unit, or a coplyamide-imide comprising from 90 to 10 mol % of the constitutional repeating unit having the structure represented by the formula (II):

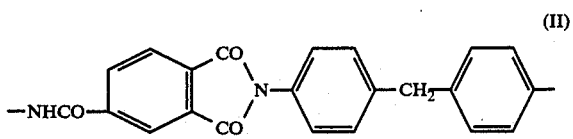

and from 10 to 90 mol % of the constitutional repeating unit having the structure represented by the formula (III):

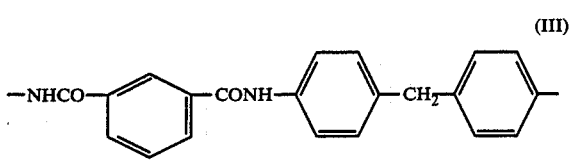

The present invention is to be described more specifically. The pervaporation referred to in the present invention is a method of separating a specific ingredient from a liquid mixture by using a polymeric membrane or a ceramic membrane. Among many separation methods, this method is effective for the separation of those forming azeotropic mixtures, for the separation of those ingredients having similar boiling points or for the separation of mixtures containing ingredients with low thermal stability, and research and development have been made vigorously in recent years.

In the present invention, water is selected as an object to be separated, and it is an object thereof to remove water from the following substantially homogenous liquid mixtures. That is, the liquid mixture means a mixture of various kinds of liquid and water with no particular restrictions for the ratio so long as it is homogenous.

Particularly, the liquid mixture can be separated preferably in a case where it is an aqueous solution of oxygen-containing organic compounds such as alcohols, phenols, esters, ketones, ethers, aldehydes and organic acids, nitrogen-containing organic compounds such as nitriles, inorganic compounds such as inorganic acids and mixture of them.

As alcohols, there can be mentioned methanol, ethanol, iso- and normal propanol, butanol, octanol, benzyl alcohol, as well as ethylene glycol, triethylene glycol, glycerin, etc. as polyhydric alcohols.

As phenols, cresol, phenol, catechols, etc. can be mentioned.

As esters, water soluble esters such as ethyl acetate, methyl acetate, ethyl formate, methyl propionate, etc can be mentioned.

As ketones, acetone, methyl ethyl ketone, acetophenone, etc. can be mentioned.

As ethers, diethyl ether, dibutyl ether, dioctyl ether, diphenyl ether, dioxane, trioxane, tetrahydrofuran, etc. can be mentioned.

As aldehydes, formaldehyde, acetoaldehyde, etc. can be mentioned.

As organic acids, formic acid, acetic acid, oxalic acid, propionic acid, etc. can be mentioned.

As nitriles, acetonitrile, acrylonitrile, etc. can be mentioned.

As inorganic acids, hydrochloric acid, sulfuric acid, nitric acid, phosphoric acid, boric acid, etc. can be mentioned.

It is considered that the aromatic copolyimide or copolyamide-imide is suitable in the present invention, because affinity of imide group and/or amide group with water is effective to the selective separation of water, which is the object of the present invention.

However, for obtaining the practically useful separating performance from the polymeric material, it is necessary to form an extremely thin polymeric membrane with no pinhole as described above. When the same material is used for the membrane, the permeating performance is more excellent as the substantial thickness of the membrane is reduced, but the separating performance is fetally reduced if pinholes are present. Accordingly, the polymeric material as the starting material for the membrane has to possess a high membrane-forming property in order to form a nearly ideal membrane. Namely, it is necessary that the material is soluble at room temperature, if possible, from a practical point of view. If it is so, various methods can easily be adopted upon membrane-formation or hollow fiber spinning and it is easy to produce an extremely thin uniform membrane, as well as an asymmetric membrane of an integral structure with the support. For satisfying the above-mentioned requirement, not all of polyimides or polyamides are suitable, but the copolyimide or copolyamide-imide having a composition as shown in the present invention is suitable.

The aromatic copolyimide used in the present invention is a copolyimide characterized by the presence of the constitutional repeating unit of the general formula (I):

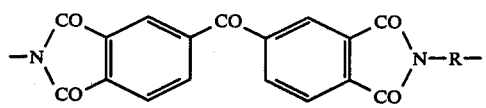

wherein R represents

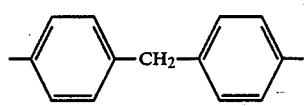

for 10 to 30 mol % of the constitutional repeating units and R also represents

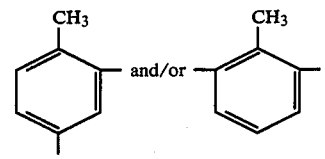

for 90 to 70 mol % of the constitutional repeating unit described above.

The copolyimide can easily be obtained, for example, as described in U.S. Pat. No. 3,708,458 by reacting 3,3',4,4'-benzophenone tetracarboxylic acid dianhydride with an appropriate molar ratio of 4,4'-methylenebisphenyl isocyanate (4,4'-diphenylmethane diisocyanate) and tolylene diisocyanate (2,4-isomer, 2,6-isomer or the mixture thereof) under the presence of a polar solvent. In this case, it is also possible to use a small amount of other diisocyanate compound or other tetracarboxylic acid compound.

Further, the aromatic copolyamide-imide used in the present invention is such an aromatic copolyamide-imide comprising from 10 to 90 mol %, preferably, from 70 to 90 mol % of the constitutional repeating unit having the structure represented by the formula (II):

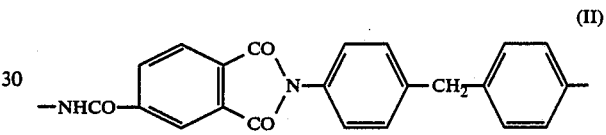

and from 90 to 10 mol %, preferably, from 30 to 10 mol % of the constitutional repeating unit having the structure represented by the formula (III):

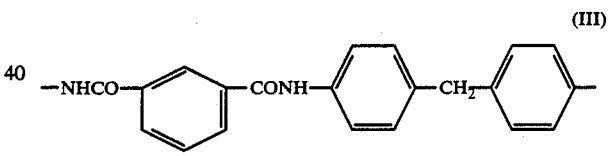

The copolyamide-imide can be obtained easily by using the operations described in U.S. Pat. No. 3,929,691, that is, by reacting a mixture of trimellitic acid anhydride and isophthalic acid at a ratio about from 10 to 90 mol %: about from 90 to 10 mol % and a substantially equivalent amount of 4,4'-methylbisphenyl isocyanate in 100 mol % ratio under the presence of a polar solvent In this case, a small amount of other diisocyanate compounds can also be used.

The solvent used for the polymerization and dissolution of the copolyimide and the copolyamide-imide is a polar organic solvent and there can be illustrated, with no particular restrictions, dimethylformamide, dimethylacetamide, N-methylpyrrolidone, dimethylsulfoxide, dimethylsulfone, hexamethyl phosphoramide, tetramethyl urea, pyridine, etc. They may be used in admixture. Preferably, dimethylformamide, dimethylacetamide and N-methylpyrrolidone are used and, more preferably, dimethylformamide is used.

The amount of the polar organic solvent used for the polymerization described above is preferably such an amount at least sufficient to initially dissolve all of the reactants. The amount of the solvent used is adjusted depending on the viscosity of the copolyimide to be produced, and the % by weight of the copolyimide, although not so important, is usually from 5 to about 35% by weight.

In view of the chemical resistance to other organic compounds present in the liquid mixture to be separated, the aromatic copolyimide and copolyamide-imide are rather excellent but not completely satisfactory. It is practically effective to insolubilize and improve the durability of a separation membrane once prepared by cross linking by means of heating, electron ray irradiation or other methods, and a material subjected to crosslinking treatment and insolubilization treatment after film-formation in this way are also included in the polymeric material referred to in the present invention. Furthermore, other polymeric material not hindering the membrane-formation, heat stabilizer, membrane-formation stabilizer, post crosslinking reagent, anti oxidation stabilizer, plasticizer, etc. may be added to the polymeric material, if used in an amount of not more than 50% by weight of the separation membrane to be produced. Various stabilizers for improving the durability can rather provide good effect depending on the case.

The inherent viscosity ($\eta$ inh) of the polyimide or copolyamide-imide described above used in the present invention is in the range of not less than 0.1 dl/g, more preferably, from 0.3–4 dl/g (measured in N-methylpyrrolidone, 0.5% at 30° C.).

The membrane used for pervaporation is a separation membrane that partitions a processing solution chamber and a permeation vapor chamber and it may be of a homogenous structure, asymmetric structure or it may be coated on a support film made of different material, so long as it is mainly composed of the copolyimide or copolyamide-imide described above as the main constituent material, and various types of the shape such as sheet, spiral, tube and hollow fiber can be adopted depending on the application uses.

The production for such membrane can be conducted by known methods, for example, a method of casting, roll coating or spin-coating of the dope containing the copolyimide or copolyamide-imide described above and a polar organic solvent as the polymerization solvent therefor on a flat plate such as a glass plate, and a method of making it into a hollow fiber as usually employed so as to enlarge the surface area.

Further, it is also possible to cast on an appropriate porous backing material (including porous hollow fiber) to further dispose a support to the membrane As the porous support, any inert porous material can be used that does not hinder the passage of the permeation gas to the membrane and does not suffer from the attack of the membrane material, solvent, coagulation solution, etc.

As typical example of the support of this kind, there can be used, preferably, metal mesh, porous ceramic, sintered glass, porous glass, sintered metal, paper and porous non-soluble plastics and, for example, non woven fabrics such as rayons, asbestos, porous polyimides can be mentioned. These materials have no concern with the separation of the material but merely function as the support for the film.

Among the shapes of the separation membrane, the hollow fiber type has merits such that effective membrane area per unit volume can be increased and mechanical strength to high pressure is excellent relative to the small thickness of the wall, in the case of applying pressure from the outside of the hollow fiber.

While the membrane can be of any configuration such as homogenous structure, porous structure or asymmetric structure, an asymmetric membrane having a dense layer on the outer surface, inner surface or both of the outer and the inner surfaces of a separation membrane is preferred.

Further, an asymmetric membrane having cavities of a finger type structure at the inside part between the outer surface and the inner surface of the separation membrane is also preferred. The cavities of the finger type structure are formed at the inside part between the inner surface and the outer surface of the hollow fiber, in one or a plurality of rows in the circumferential direction. In a case where the cavities are formed in one row in the circumferential direction, the size of the cavity is, for example, such that the longer diameter of the cavity is less than the wall thickness of the hollow fiber, which preferably from 99 to 1%, more preferably, from 99 to 50% of the wall thickness. Further, in a case where the cavities are formed in two or more rows in the circumferential direction, the sum of the longer diameter of respective cavities on one identical diameter is less than the wall thickness, preferably, from 99 to 1% and, more preferably, from 99 to 50% of the wall thickness. The shorter diameter of the cavity can be equal to or shorter than the longer diameter.

Since the portions other than the cavities of the finger type structure have a porous structure in which the average pore diameter varies in the direction of the thickness, it is possible to substantially neglect the permeation resistance in the membrane, thereby obtaining sufficient permeation rate and mechanical strength.

As the dope used for the preparation of the membrane, a solution of the copolyimide and/or copolyamide-imide which is adjusted to a solid concentration usually from 8 to 35% by weight and, preferably, from 15 to 30% by weight is used.

A thin membrane is formed from such a dope by casting or hollow fiber extrusion described above.

Then the thin membrane is immersed in a coagulating solution immediately or after evaporating a portion of the solvent in the thin membrane by heating in the atmosphere at 20°–150° C., preferably, 40°–120° C.; for 2–300 sec, preferably, 10–180 sec, more preferably, from 20–120 sec. Alternatively, hot blow may be blown at a temperature in the above range. This can vary the thickness of the surface dense layer in the structure of the asymmetric membrane and the permeating performance of the obtained film can easily be controlled.

The coagulating solution can properly be selected from those having preferred compatibility with the dope and having low solubility to the copolyimide or copolyamide-imide described above (poor solvent). For instance, there can be mentioned water, lower alcohols such as propanol, ketones such as acetone, ethers such as ethylene glycol, aromatic compounds such as toluene or a mixed liquid thereof, and water is preferably used in view of economical advantage and public pollution.

The temperature of the coagulating solution is preferably in a range from 0° to 80° C. and, more preferably, from 0° to 50° C.

A method of coagulating the dope from which a portion of the solvent has been evaporated may be of any known methods. For instance, there can be mentioned a method of immersing a composite membrane into the coagulating solution described above, or a method of immersing the hollow fiber into a coagulating solution.

The coagulated wet membrane is preferably air-dried or immersed in alcohols or hydrocarbons to remove the solvent and the coagulation solution in a low concentration.

Then, the solvent and the coagulating solution, etc. are removed from the membrane by drying usually at a temperature lower than 250° C. For the method, temperature may be increased gradually from the room temperature, or temperature may be elevated at a plurality of steps in each of the temperature range. Too rapid drying is not preferred in view of foaming, etc.

The drying temperature, time and the membrane thickness of the coagulated wet membrane described above vary depending on the kind of the solvent, the amount of volatile component in the coagulated wet membrane and, accordingly, they may be determined properly in each of the case.

The membrane according to the present invention is preferably applied with further heat treatment. The temperature for the heat treatment is preferably not lower than 250° C. and, a range not lower than 280° C. and not higher than 500° C. is most preferred.

If the temperature of the heat treatment is lower than 250° C., the separation ratio between the water and the water-soluble organic compound tends to be lowered. The membrane treated at a temperature higher than 280° C. shows less reduction in the separation ratio for the pervaporation. The higher the temperature of heat treatment of the membrane is, the more stable it is to high temperature and high concentration of organic compounds in the practical pervaporation process.

The heat treatment can be conducted for a time from several seconds to several tens hours, in which longer time is required if the temperature for the heat treatment is lower and it is preferred to conduct in a short period of time if the temperature is higher. The suitable heat treating time is selected depending on the temperature. In the case of usual heat treating temperature from 2 to 30 min, 280°-320° C. is preferred. If the temperature for the heat treatment is lower than 250° C., it is generally difficult to obtain a separation film with high separation ratio even if the time for the heat treatment is long.

In addition, it is extremely effective to insolubilize and improve the durability of the membrane used in the present invention for improving the separating performance. The insolubilization method can be conducted by the heat treatment as described above, as well as by electron ray irradiation, chemical crosslinking or other method.

It is preferred that the copolyimide or copolyamide-imide membrane contains not less than 1% by weight, preferably, from 3 to 90% by weight of the insoluble component. The "insoluble ingredient" referred to herein means an insoluble component in a case where the copolyimide or copolyamide-imide membrane is subjected to dissolving treatment in a polar solvent, particularly, dimethylformamide at a temperature of 25° C. for 24 hours.

In the insolubilization, it is sufficient that only the substantial surface layer of the membrane may be insolubilized. In the case where only the surface layer as the active layer for the separation is treated at a high temperature for a short period of time, or the surface is insolubilized by the electron ray irradiation, the content of the insoluble component is represented by the amount in the surface layer up to 10 $\mu$m thickness as the surface layer.

Although the membrane not applied with the drying treatment and the heat treatment as described above can also be used, the separating performance for each kind of gases, and strength such as tensile strength, tensile elongation at break, etc. can significantly be improved by applying the heat treatment.

In the process according to the present invention, the porosity, pore shape and thickness of the dense layer can easily be varied depending on the concentration of the copolyimide or copolyamide-imide in the dope, type of the solvent, combination of the solvent, addition of swelling agent, evaporization conditions, heat treating conditions, types of coagulating agent, coagulating conditions, etc.

However, since the copolyimide or copolyamide-imide dissolved in at normal temperature in a polar organic solvent such as N,N-dimethylformamide, dimethylacetamide and N-methylpyrrolidone can easily provide a porous structure in the coagulant such as water without adding a swelling agent, there is no particular requirement for the addition of the swelling agent.

The thickness of the membrane is about 0.01–1,000 $\mu$ and, more typically, the entire thickness of 10–500 $\mu$ is preferred.

For removing the water from a liquid mixture by the pervaporation using the membrane, the liquid mixture is continuously supplied into a vessel containing the membrane, brought into contact with one side of the membrane and then continuously discharged out of the vessel. The direction of the flow upon supplying the liquid mixture may be in parallel or in perpendicular to the surface of the membrane, but it is preferred to flow it at a speed as high as possible in parallel with the surface of the membrane in order to prevent the occurrence of concentration polarization near the membrane surface. The liquid mixture may be of atmospheric pressure or may be pressurized. Although the temperature for the liquid mixture has no particular restriction, it is suitably from 30°–150° C., preferably, 60°–120° C., under a pressure as required, in the case of the aqueous ethanol solution.

On the other side of the membrane may be maintained at a reduced pressure by a reduced-pressure maintaining device such as a vacuum pump, or, an inert gas may be flowed thereby keeping the partial pressure of the permeated component at a low pressure. In the case of recovering the pervaporated component, one or plurality of cold traps or condensators is disposed in a pipeway that connects the vessel and the reduced-pressure maintaining device and it is cooled to lower than its condensation point and recovered.

BEST MODE FOR PRACTICING THE INVENTION

The present invention is to be described more specifically referring to examples.

REFERENCE PREPARATION EXAMPLE 1

Using the procedures as described in Example 4 of U.S. Pat. No. 3,708,458, a copolyimide was produced from 3,3',4,4'-benzophenone tetracarboxylic acid anhydride and a mixture containing 80 mol % of tolylene diisocyanate (mixture of about 80 mol % of 2,4-isomer and about 20 mol % of 2,6-isomer) and 20 mol % of 4,4'-diphenylmethane diisocyanate.

N,N'-dimethylformamide was used as the polymerization solvent and the resin concentration was 21% by weight.

By condensing, 25% by weight of a copolyimide resin solution was obtained.

The copolyimide had an intrinsic viscosity at 30° C. (0.5% in dimethylformamide) of 0.6 dl/g.

EXAMPLES 1-8

The copolyimide solution obtained in the Reference Preparation Example 1 was extruded at a constant flow rate (2.9 g/min) and, simultaneously, a solution comprising water and dimethylformamide mixed at a ratio of 50/50 (weight ratio) as a core solution was extruded to the central portion of the hollow fiber at a constant flow rate from a nozzle for producing a hollow fiber. The thus formed hollow fiber product was introduced into a coagulation bath of water while taking up at a constant speed (5 m/min) with a 12 cm air gap, and immersed for 8 sec and, further, immersed in water for 10 min. Then, after air-drying for one day and night, it was dried at 100° C. for 30 min and then, subjected to heat treatment at the temperature from 200° C. to 300° C. for 13 min, and at 300° C. for 17 min.

The thus obtained hollow fiber had an outer diameter of 680 μm and inner diameter of 356 μm.

Using the hollow fiber, a pervaporation test was conducted under the conditions shown in Table 1 and the result of the measurement is shown in Table 1.

The liquid permeation amount in Table 1 means the weight of the solution permeated through the film per unit film area and unit time, and represented by Kg/m²-hr.

The separation factor is defined by the following equation:

$$\text{Separation factor} = \frac{Yi/Yj}{Wi/Wj}$$

wherein
Wi: weight ratio of water in the supplied solution
Wj: weight ratio of the ingredients other than water in the supplied solution
Yi: weight ratio of water in the permeated solution
Yj: weight ratio of the ingredients other than water in the premeated solution Further, the proportion of the dimethylformamide-insoluble ingredients in the hollow fiber was measured. As the measuring method, 1 g of the hollow fiber was immersed in 100 g of dimethylformamide, left for 20 hours and then stirred for 4 hours by a stirrer to dissolve the soluble ingredients. The solution was filtered through filter paper to remove insoluble ingredients and obtain clear liquid filtrate. The solution was evaporated to dryness by distilling out dimethylformamide by a rotary evaporator. Further, the solid residue was dried at 300° C. for 30 min and the amount of the soluble ingredients was measured after cooling. The content of the insoluble ingredients was measured due to the difference with respect to the entire amount.

$$\text{Content of the insoluble ingredient (wt \%)} = 100 - \text{soluble ingredient content}$$

The content of the insoluble ingredients in the hollow fiber was 28 wt. %.

EXAMPLE 9

Pervaporation was conducted at 80° C. using the hollow fiber obtained under the same spinning conditions as those in Examples 1-8 except for setting the heat treatment temperature at 200° C. for 30 min, and using an aqueous solution containing 50 wt. % concentration of ethanol as feed solution. The content of the insoluble ingredients in the hollow fiber was not higher than 0.5 wt. %.

The result is shown in Table 1.

EXAMPLES 10, 11

Pervaporation was conducted at 80° C. using the hollow fiber obtained under the same spinning conditions as those in Examples 1-8 and using solutions with mixing ratio of water/acetic acid (weight ratio) of 80/20 and 40/60 as the feed solutions.

The result is shown in Table 1.

EXAMPLE 12

Pervaporation was conducted at 80° C. using the hollow fiber obtained under the same spinning condition as those in Examples 1-8 and using solutions with mixing ratio of water/formalin (weigh ratio) of 82.5/17.5 as the feed solution.

EXAMPLES 13-18

The copolyimide solution obtained in the Reference Preparation Example 1 was extruded at a constant flow rate (2.9 g/min) and, simultaneously, air as a core gas was introduced into the central portion of the hollow fiber at a constant flow rate (0.58 cc/min) from a nozzle for producing a hollow fiber. The hollow fiber was introduced into a coagulation bath of water, immersed for 8 sec and, further, immersed in water for 10 min in another bath while continuously taking up at a constant speed (4.5m/min). Then, after air-drying for one day and night, it was dried at 100° C. for 30 min and then, subjected to heat treatment at the temperature from 200° C. to 300° C. for 13 min and at 300° C. for 17 min.

Using the hollow fiber, a pervaporation test was conducted under the conditions shown in Table 1.

The content of the insoluble ingredient in the hollow fiber was 32 wt. %.

The result of the measurement is shown in Table 1.

EXAMPLES 19-25

A pervaporation test was conducted under the conditions as shown in Table 1 by using the hollow fiber obtained under the same spinning condition as those in Examples 13-18 except that heat treatment was conducted at a temperature of 320° C. for 14 min after elevating the temperature from 200° C. to 320° C. in 16 min, or at 260° C. for 23 min after elevating the temperature from 200° C. to 260° C. in 7 min. The contents of the insoluble ingredient in the hollow fiber treated at 320° C. or 260° C. were 60 wt. % and 1.3 wt. %, respectively.

The result is shown in Table 1.

EXAMPLES 26-28

A pervaporation test was conducted at 50° C., 70° C. and 80° C. using the hollow fiber membrane obtained under the same spinning conditions as those in Examples 13-18 except for elevating the temperature from 200° C. to 320° C. in 16 min and treating at 320° C., and using an aqueous 50 wt. % solution of acetic acid as the supplied solution.

The result is shown in Table 1.

EXAMPLE 29

The copolyimide solution obtained in Reference Preparation Example 1 was extruded at a constant flow rate (2.9 g/min) and, simultaneously, water was extruded at a constant flow rate as a core solution from a hollow fiber nozzle. Thus formed hollow fiber product was introduced with a 12 cm air gap into a coagulation solution of water while continuously taking up at a constant speed (4.8 m/min), stayed for 8 sec in the bath, and then immersed in water of another bath for 10 min. Then, after air-dried for one day and night, dried at 100° C. for 30 min, and then heat treated at 300° C. for 17 min after elevating the temperature from 200° C. to 300° C. in 13 min.

A pervaporation test was conducted at 80° C. using the copolyimide hollow fiber obtained above and using an aqueous 80 wt. % solution of ethanol as the supplied solution.

The result is shown in Table 1.

The content of the insoluble ingredient of the hollow fiber was 37 wt. %.

TABLE 2

| | Pervaporation condition | | | | |
|---|---|---|---|---|---|
| example | Water soluble organic compound | Concentration (wt %) | Temperature (°C.) | Liquid permeation amount (kg/m²-hr) | Separation factor |
| 30 | Acetone | 20 | 55 | 0.82 | 9.1 |
| 31 | Tetrahydrofuran | 20 | 60 | 0.82 | 92.6 |
| 32 | Phenol | 8 | 80 | 0.07 | 5.8 |
| 33 | Acetonitrile | 20 | 70 | 1.1 | 2.8 |
| 34 | Formaldehyde | 17.5 | 80 | 1.2 | 45.32 |
| 35 | Ethyl acetate | 20 | 70 | 0.74 | 6.7 |

REFERENCE PREPARATION EXAMPLE 2

To a preliminarily dried 10 liter reactor, 614.82 g (3.20 mol) of trimellitic acid anhydride and 132.90 g (0.80 mol) of isophthalic acid were fed. The reactor was equipped with a thermometer, a condenser, a stirrer and a hydrogen inlet.

4,4'-methylenebisphenyl isocyanate (hereinafter simply referred to as MDI) was weighted by 1000.96 g (4.0 mol) into a dried 5 liter bottle and then 434 ml of N-methylpyrrolidone (hereinafter simply referred to as NMP) was added to dissolve MDI. The MDI solution was added to the above-mentioned reactor and then the bottle was rinsed with 3,650 ml of NMP. The solution was heated from 53° C. to 170° C. in a nitrogen atmosphere for 3 hours and 40 min under the stirring rate of 65 rpm and, the reaction was further continued at 169°–171° C. for one hour and 55 min. The reaction mixture was a 25 wt. % NMP solution of a copolyamide-imide in which 80 mol % of the repeating unit have the structure of:

TABLE 1

| | Spinning condition | | | Pervaporation condition | | | Liquid | |
|---|---|---|---|---|---|---|---|---|
| Example | Core liquid composition (wt %) | Air gap (cm) | Heat treatment temperature (°C.) | water-soluble organic compound | Concentration (wt %) | Temperature (°C.) | permeation amount (Kg/m²-hr) | Separation factor |
| 1 | Water/DMF = 50150 | 12 | 300 | ethanol | 20 | 80 | 1.4 | 20 |
| 2 | " | " | " | " | 50 | 80 | 1.1 | 45 |
| 3 | " | " | " | " | 80 | 30 | 0.1 | 145 |
| 4 | " | " | " | " | 80 | 50 | 0.25 | 140 |
| 5 | " | " | " | " | 80 | 70 | 0.45 | 130 |
| 6 | " | " | " | " | 80 | 80 | 0.67 | 125 |
| 7 | " | " | " | " | 80 | 90 | 1.0 | 180 |
| 8 | " | " | " | " | 90 | 80 | 0.4 | 160 |
| 9 | " | " | 200 | " | 50 | 80 | 7.5 | 3 |
| 10 | " | " | 300 | acetic acid | 20 | 80 | 0.87 | 50 |
| 11 | " | " | " | " | 60 | 80 | 0.65 | 60 |
| 12 | " | " | " | formalin | 17.5 | 80 | 1.2 | 80 |
| 13 | Air | 0 | 300 | ethanol | 50 | 80 | 1.7 | 425 |
| 14 | " | " | " | " | 80 | 50 | 0.3 | 820 |
| 15 | " | " | " | " | 80 | 70 | 0.8 | 845 |
| 16 | " | " | " | " | 80 | 80 | 1.2 | 680 |
| 17 | " | " | " | " | 95 | 80 | 0.48 | 1400 |
| 18 | " | " | " | " | 98 | 80 | 0.25 | 1110 |
| 19 | " | " | 320 | " | 50 | 80 | 0.22 | 1000 |
| 20 | " | " | " | " | 80 | 80 | 0.19 | 8800 |
| 21 | " | " | " | " | 95 | 80 | 0.09 | 5500 |
| 22 | " | " | 260 | " | 50 | 80 | 2.4 | 220 |
| 23 | " | " | " | " | 80 | 80 | 1.75 | 670 |
| 24 | " | " | " | " | 90 | 80 | 1.45 | 180 |
| 25 | " | " | " | " | 95 | 80 | 0.8 | 180 |
| 26 | " | " | 320 | acetic acid | 50 | 50 | 0.08 | 120 |
| 27 | " | " | " | " | 50 | 70 | 0.16 | 410 |
| 28 | " | " | " | " | 50 | 80 | 0.25 | 830 |
| 29 | Water | 12 | 300 | ethanol | 80 | 80 | 0.9 | 400 |

EXAMPLES 30–35

A pervaporation test was conducted by using the hollow fiber obtained under the same spinning conditions as those in Examples 13–18 and by using a mixed solution of water/acetone, a mixed solution of water/tetrahydrofuran, a mixed solution of water/phenol, a mixed solution of water/acetonitrile, a mixed solution of water/formaldehyde and a mixed solution of water/ethyl acetate under the conditions shown in Table 2.

The result is shown in Table 2.

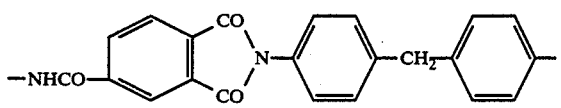

formed into a 20 wt. % solution of DMF. The solution was filtered to obtain a dope for use in hollow fiber spinning. A hollow fiber was formed therefrom according to the membrane preparation example 1 and the result of the pervaporation test is shown in Table 3.

TABLE 3

| | Spinning condition | | | Pervaporation condition | | Liquid permeation amount (Kg/m²-hr) | Separation factor |
|---|---|---|---|---|---|---|---|
| Example | Core liquid composition | Air gap (cm) | Heat treatment temperature (°C.) | Water-soluble organic compound (wt %) | Temperature (°C.) | | |
| 36 | water | 12 | 275 | ethanol 80 | 80 | 4.9 | 30 |
| 37 | | | 295 | | | 0.3 | 75 |
| 38 | | | 305 | | | 0.15 | 2000 |
| 39 | water/DMF | 12 | 305 | ethanol 50 | 80 | 1.0 | 50 |
| 40 | (50/50 wt %) | | | 80 | | 0.5 | 100 |
| 41 | | | | 90 | | 0.4 | 140 |
| 42 | | | | acetic acid 20 | 80 | 0.7 | 30 |
| 43 | | | | 60 | 80 | 0.5 | 40 |
| 44 | air | 0 | 305 | ethanol 50 | 80 | 1.2 | 100 |
| 45 | | | | 80 | | 0.8 | 500 |
| 46 | | | | 95 | | 0.3 | 800 |
| 47 | | | | 98 | | 0.1 | 600 | while 20 mol % thereof have the structure of:

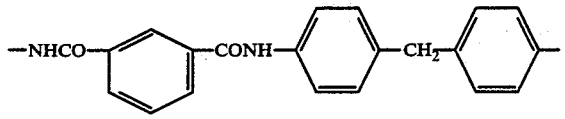

The inherent viscosity ($\eta$ inh) of the copolyamide-imide at 30° C. was 0.603 dl/g (in NMP, 0.5%).

The solution was added to methanol and the precipitated polymer was dried at 150° C. for 3 hours to obtain the powder of copolyamide-imide.

The copolyamide-imite powder was dissolved into dimethylformamide to obtain a 17 wt. % solution as a dope for preparing a separation membrane.

MEMBRANE PREPARATION EXAMPLE 1

After filtration, the copolyamide-imide solution prepared as above was extruded through a hollow fiber nozzle at a constant flow rate (2.9 g/min) and, simultaneously, water, a solution of water/DMF=50/50 (weight ratio) as the core liquid or air was extruded to form a hollow fiber composition. This composition was introduced into a coagulating solution of water while continuously taking up at a constant rate of 4.8 m/min with an air gap as shown in Table 2 and then immersed in the coagulating solution for 8 sec. Further, it was immersed in a water bath for 10 min. Then, it was air dried for one day and night and, dried at 100° C. for 30 min, and heat-treated finally under the conditions as shown in Table 3. The result of the pervaporation test using these hollow fibers is shown in Table 3.

EXAMPLES 36-51

Result of the pervaporation under the respective conditions using the hollow fiber prepared in Preparation Example 2 and Membrane Preparation Example 1 is shown in Table 3.

EXAMPLES 52-55

The copolyamide-imide prepared in the Preparation Example 2 and benzophenone type copolyimide PI-2080 were mixed in 60:40 weight ratio and further

EXAMPLES 56-61

Pervaporation shown in Table 4 was carried out, using the same hollow fiber as used in Example 44.
The result is shown in Table 4.

TABLE 4

| | Pervaporation condition | | Liquid permeation amount (Kg/m²-hr) | Separation factor |
|---|---|---|---|---|
| Example | water-soluble organic compound (wt %) | Temperature (°C.) | | |
| 56 | acetone 20 | 55 | 0.75 | 10 |
| 57 | tetrahydrofuran 20 | 60 | 0.7 | 80 |
| 58 | phenol 8 | 80 | 0.05 | 5 |
| 59 | acetonitrile 20 | 70 | 1.0 | 3 |
| 60 | formaldehyde 17.5 | 80 | 1.1 | 35 |
| 61 | methyl acetate 20 | 70 | 0.7 | 5 |

EXAMPLES 62-63

A pervaporation test was conducted by using the hollow fiber obtained under the same spinning conditions as those in Examples 1-8 except for heat treating at 100° C. and 200° C., and by using a mixed solution of water/acetic acid of the mixing ratio of 40/60 (weight ratio) as the supplied solution.
The result is shown in Table 5.

TABLE 5

| Example | Heat treatment temperature (°C.) | Insoluble ingredient content (wt %) | Liquid permeation amount (Kg/m²-hr) | Separation factor |
|---|---|---|---|---|
| 62 | 100 | 0 | 5.0 | 1.5 |
| 63 | 200 | 0 | 2.6 | 2.2 |

EXAMPLES 64-66

Pervaporation and measurement of the content of insoluble ingredients were carried at 80° C. using the hollow fiber obtained under the same spinning conditions as those in Examples 13-18 except for heat treating at a temperature shown in Table below and using a solvent of water/ethanol=90 (weight ratio).
The result is shown in Table 6.

TABLE 6

| Example | Heat treatment temperature (°C.) | Insoluble ingredient content (wt %) | Liquid permeation amount (Kg/m²-hr) | Separation factor |
|---|---|---|---|---|
| 64 | None (air drying product) | 0 | 5.5 | 3 |
| 65 | 150 | 0 | 5.4 | 5 |
| 66 | 220 | 0.5 | 1.5 | 20 |

EXAMPLES 67–74

Test for the pervaporation and the content of insoluble ingredients were carried out by using the hollow fibers obtained under the same spinning conditions as those in Examples 13–18 except for treating at a temperature shown in the Table below and using a mixed solution of water/acetone, a mixed solution of water/acetonitrile, a mixed solution of water/acetic acid, a mixed solution of water/isopropyl alcohol and a mixed solution of water/n-hexane/isopropyl alcohol as the supplied solution under the conditions in Table 7.

The result is shown in Table 7.

TABLE 7

| Example | Heat treatment temperature for hollow thread (°C.) | Insoluble ingredient content (wt %) | Pervaporation condition | | | Liquid permeation amount (Kg/m²-hr) | Separation factor |
|---|---|---|---|---|---|---|---|
| | | | Water soluble organic compound | Conc. (wt %) | Temperature (°C.) | | |
| 67 | 325 | 67 | acetone | 95 | 55 | 0.095 | 55 |
| 68 | 330 | 82 | acetone | 95 | 55 | 0.044 | 5200 |
| 69 | 325 | 67 | acetonitrile | 50 | 40 | 0.048 | 170 |
| 70 | 320 | 62 | acetic acid | 80 | 80 | 0.31 | 560 |
| 71 | 310 | 38 | isopropyl alcohol | 90 | 80 | 0.785 | 5000 |
| 72 | 310 | 38 | isopropyl alcohol | 95 | 80 | 0.460 | 10000 |
| 73 | 310 | 38 | isopropyl alcohol | 98 | 80 | 0.174 | 15000 |
| 74 | 310 | 38 | n-hexane/ isopropyl alcohol | 91.7/7.9 | 60 | 0.16 | 6400 |

INDUSTRIAL APPLICABILITY

According to the separation method of the present invention, since water can effectively be separated from a liquid mixture in the pervaporation method, it is useful as the separation method in various industries.

We claim:

1. A separation method for removing water from a liquid mixture containing water by pervaporation, which comprises contacting the liquid mixture to be separated with one side of an asymmetric membrane while maintaining the other side of the asymmetric membrane as a gaseous phase, said pervaporation being at a pressure as low as atmospheric pressure or underpressure, the asymmetric membrane being subject to heat treatment at a temperature of not lower than 250° C. in the production thereof and comprising as the main constituent material a copolyimide comprising the constitutional repeating unit represented by the following formula (I):

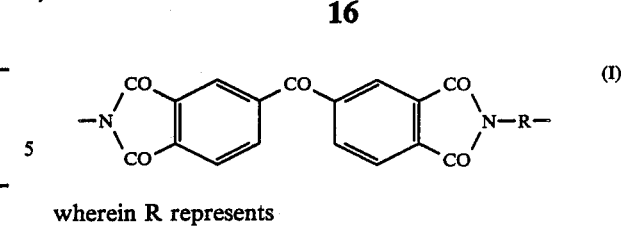

wherein R represents

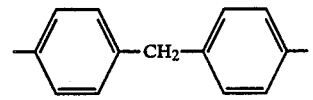

for from 10 to 30 mol % of said repeating unit, while R also represents

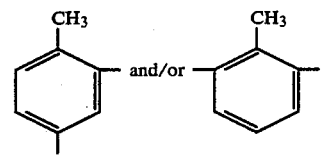

for from 90 to 70 mol % of said repeating unit, or a copolyamide-imide comprising from 90 to 10 mol % of the constitutional repeating unit represented by the following formula (II):

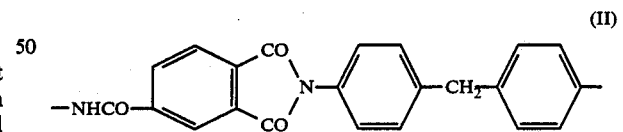

and from 10 to 90 mol % of the constitutional repeating unit represented by the following formula (III):

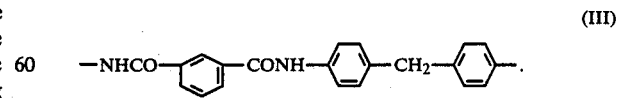

2. A separation method according to claim 1, wherein the copolyimide membrane or copolyamide-imide membrane is heat treated at a temperature from 280° to 500° C.

3. A separation method according to claim 1, wherein the membrane after the heat treatment contains the dimethyl-formamide-insoluble ingredient of not less than 1% by weight.

4. A separation method according to claim 3, wherein the membrane after the heat treatment contains the dimethylformamide-insoluble ingredient of from 3 to 90% by weight.

5. A separation method according to claim 1, wherein the liquid mixture is an aqueous solution of an oxygen-containing organic compound, a nitrogen-containing organic compound, an inorganic compound and a mixture thereof.

6. A separation method according to claim 5, wherein the oxygen-containing organic compound is alcohols, phenols, esters, ketones, ethers, aldehydes or organic acids.

7. A separation method according to claim 5, wherein the nitrogen-containing organic compound is nitriles.

8. A separation method according to claim 5, wherein the inorganic compound is inorganic acids.

* * * * *